April 5, 1960 M. YONTAR 2,931,692

SHEET RECORD MACHINE

Filed Jan. 9, 1956 2 Sheets-Sheet 1

INVENTOR
Mehmet Yontar
BY George H. Fritzinger
Agt.

INVENTOR
Mehmet Yontar
BY George H. Fritzinger
Agt.

United States Patent Office 2,931,692

Patented Apr. 5, 1960

2,931,692

SHEET RECORD MACHINE

Mehmet Yontar, New York, N.Y., assignor, by mesne assignments, to McGraw-Edison Company, Elgin, Ill., a corporation of Delaware Application January 9, 1956, Serial No. 558,031

6 Claims. (Cl. 346—138)

This invention relates to sheet record machines which have a revolvable record support with an endless peripheral surface for carrying a flexible sheet record in wrap-around relation thereto. The invention is in some respects an improvement on the sheet record machine described in the commonly owned pending application Serial No. 468,442 of Dinsmore et al., filed November 12, 1954, now Patent No. 2,889,191, dated June 2, 1959.

The invention is adapted especially for use with magnetic recording and reproducing machines which use a thin, flexible sheet record coated with magnetizable particles and wrapped through substantially one full revolution around the record support, with attachment of the leading edge of the sheet record thereto to provide for drive of the record therewith. In such machines a magnetic head is propelled slowly across the record as the latter is rotated to cause the head to scan a helical track on the sheet record with repeated crossing of the joint between the leading and trailing edges thereof. When the sheet record is removed from the support and laid out flat the scanning track appears as a series of parallel lines.

In the present form of machine there is provided a sheet guide structure having a slot for directing a sheet record into a loading position and for receiving and guiding the sheet record out of the machine as the record support is reversed. This slot may be provided with a closure member at its outer end which is movable to an open position to form a flared opening for facilitating the insertion of a sheet record into the slot. This closure member is so mounted that it can be moved yieldably beyond a normal open position into an "eject" position to start the drive mechanism in a reverse direction for ejecting a sheet record from the record support through the guide slot.

A feature of the present invention resides in leaving the record scanning heads in engagement with the record during the record-ejecting and loading operations but to provide for reversing the drive mechanism only when the trailing edge of the mounted sheet record is in an eject range of travel ahead of the guide slot but not in advance of the scanning head. If the trailing edge of the mounted sheet record is in advance of the scanning head but not beyond the guide slot when the closure member is moved into its eject position, the record support is first advanced until the trailing edge is moved beyond the guide slot and is then reversed to start the ejecting operation. Also, there is provided means for starting the record drive in the forward direction by closing the aforestated closure member and for stopping automatically the record drive when the leading edge of the sheet record has been wrapped around the record support to a point beyond the scanning heads.

Since it is required that a guide structure extend around the record support throughout at least the eject range, the far end of the eject range from the guide slot is determined by the guide structure instead of by the positioning of the scanning heads. For reasons of simplicity, the guide structure is desirably terminated short of the scanning heads. However, it is preferably made long enough to provide for a suitable eject range which may, for instance, be of the order of one-half the circumferential length of the record support.

An object of my invention is to provide a sheet record machine which has both mounting and ejecting controls operable for mounting and ejecting sheet records onto and from the record support by the drive power of the machine.

Another object is to provide a sheet-mounting apparatus adapted to receive a sheet record into a loading position and to effect a predetermined wrap-around of the sheet record onto the record support in response to starting the record drive means.

Another object is to provide a sheet-mounting start means for the record drive mechanism of a sheet record machine which, when operated, will cause the record support to be advanced to pick up a sheet record from a loading position and to carry the sheet record at least past the record scanning head before the drive mechanism is stopped.

Another object is to provide a sheet record ejecting mechanism which is dependably operable to strip a sheet record from the support without requiring the scanning means to be lifted from the support.

Another object is to provide a sheet-ejecting start means for the record drive mechanism of a sheet record machine, which is provided with automatic direction control to assure that the trailing edge of the sheet record is in a predetermined eject range ahead of the record stripping means when the record support is started in a reverse direction.

Further objects are to control both the sheet record mounting and ejecting mechanisms by manipulation of a guide member at the outer end of the loading and ejecting slot.

These and other objects and features of my invention will be apparent from the following description and the appended claims.

In the description of my invention reference is had to the accompanying drawings, of which:

Figure 1:
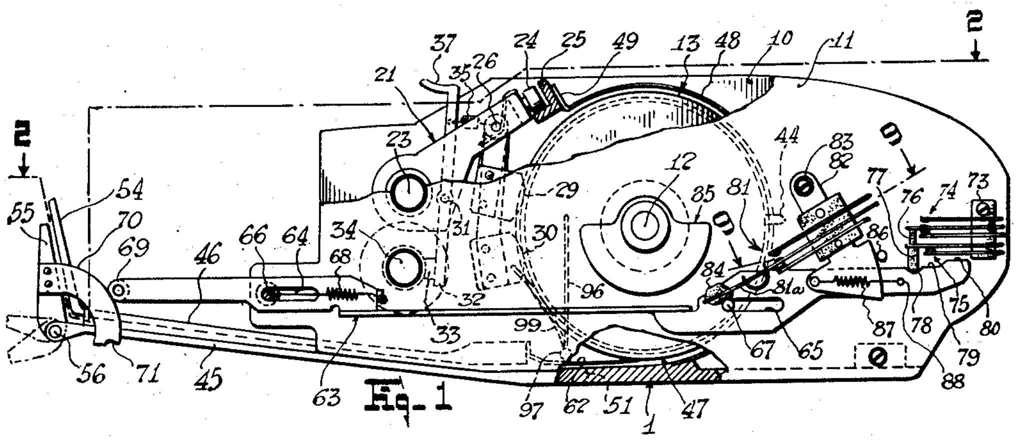
Figure 1 is a fractional, side elevational view of a sheet record machine with parts broken away.

The sheet record machine shown in the accompanying drawings is adapted for operation on and from magnetic sheet records. The machine has a base 1 provided with side standards 10 and 11. These standards have bearings for a shaft 12 carrying a rotatable record support in the form, for example, of a drum 13. The drum is driven by a motor 14 coupled as by a belt 15 to an intermediate wheel 16. This wheel is journaled in a bearing 17 on the standard 10 and has a stub shaft 18 coupled as by a belt 19 to a wheel 20 fixed onto the shaft 12 of the drum. This constitutes a permanent drive connection between the motor and the drum, which is made possible by the use of a suitable quick-start motor of the reversible type such as is known in the art.

At the front of the drum there is a carriage 21 of an inverted U-shape the opposite legs of which are mounted onto a sleeve 22. The sleeve slidably embraces a cross rod 23 carried at its ends by the standards 10 and 11. The carriage is supported in a rearwardly-inclined position, as it appears in Figure 1, by means of a roller 24 on the upper portion thereof, which rides on an angle bar 25 supported at its ends by the two standards. Both the support rod 23 and bar 25 are mounted in parallel relation to the axis of the drum.

The carriage carries a cross pin 26 in its upper portion on which are pivoted two depending arms 27 and 28 carrying respectively an erase head 29 and a recorder-reproducer head 30 at their lower ends. By mounting the heads onto confronting sides of the two arms one head is vertically in line with the other so that both will simultaneously scan the same track on the record. By suitable biasing of the arms, as by torsion springs 27*a* and 28*a* on the cross pin 26, the heads are pressed against the drum with the desired pressure.

On the carriage near the sleeve 22 is another cross pin 31 on which is pivoted an upright lever 32 carrying a feed nut 33 at its lower end. This feed nut engages a feed screw 34 under influence of a tension spring 35 connected between an upper part of the lever 32 and the pin 26. The feed screw is supported by bearings in the standards 10 and 11 and is driven in fixed relation with the drum by a permanent drive coupling thereto as by a chain drive generally indicated at 36. A fingerpiece 37 at the top of the lever 32 enables easy manual shifting of the lever to disengage the feed nut and permit movement of the carriage as desired.

Figures 4, 6:
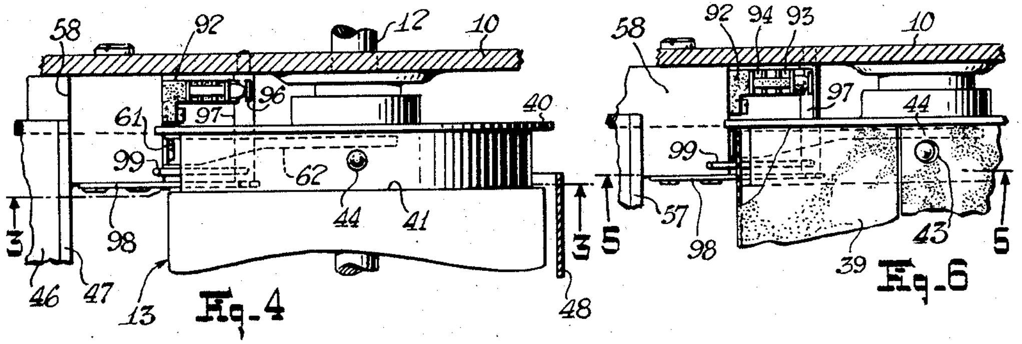
Figure 4 is a plan view of a fractional portion of the machine taken on the line 4—4 of Figure 3.
Figure 6 is a plan view of the portion of the machine shown in Figure 5.

The drum is covered with a layer 38 of resilient material to provide a yieldable backing for a sheet record 39 mounted in wrap-around relation thereto. At the ends of the drum there are rim flanges 40 or other suitable means for accurately locating the sheet record lengthwise of the drum. However, the rubber layer 38 is cut short of reaching the rim flanges so as to provide the drum with peripheral grooves 41 and 42 at the left and right ends thereof. The sheet record has drive holes or eyelets 43 in the leading corner portions thereof, one of which is shown in Figure 6, for receiving corresponding drive pins 44 projecting radially from the grooved end portions of the drum. Once the leading portion of the sheet record is so attached to the drum the sheet record is carried in wrap-around relation thereto as the drum is advanced. The leading and trailing edges of the mounted sheet record may be in overlapped or in substantially butt-joint relationship, the latter being indicated in Figure 6 by way of example.

When the drum is driven in a forward direction the heads scan a helical track thereon with the erase head positioned in advance of the recording head to erase progressively any prior recording on the track being scanned. When the machine is used as a reproducing instrument, the erase head is disabled.

Figure 2:
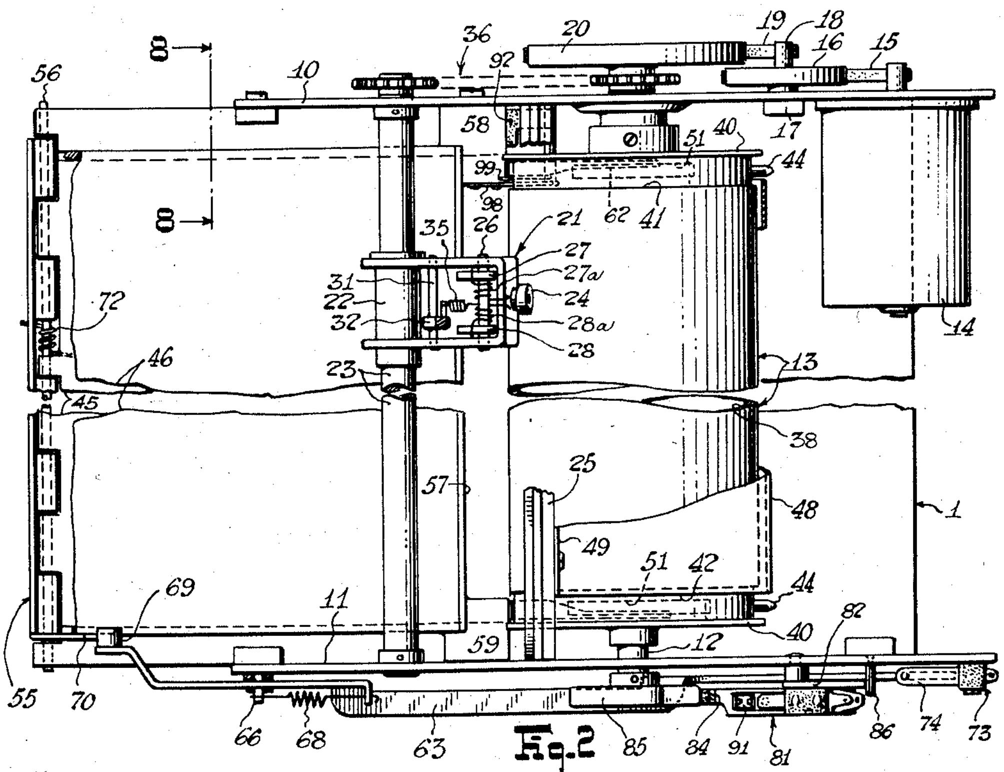
Figure 2 is a fractional, plan view taken substantially on the line 2—2 of Figure 1.
Figure 8:
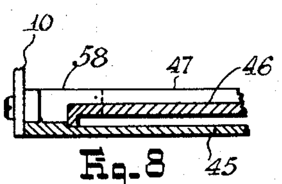
Figure 8 is a section on the line 8—8 of Figure 2.

The mounting of a sheet record onto the drum 13 involves first presenting the record into a loading position wherein its leading portion is closely adjacent to the drum, and in then advancing the drum to cause the drive pins to engage the holes in the leading corners of the sheet record and to drive the sheet record into wrap-around relation with the drum. The means for presenting the sheet record into loading position comprises a loading apparatus having a slot which is desirably made approximately as long as the length of the sheet record. The slot is formed between a lower upwardly-inclined plate 45—which may be an integral extension of the base 1—and a spaced, overlying plate 46 of which the latter has turned-down side flanges to close the slot at the sides. Directly below the drum the base 1 has a curved surface 47 conforming arcuately with the drum in spaced relation thereto. The base is recessed to receive the lower end portion of an arcuate guide plate 48 which forms an even extension of the curved surface 47 about the drum to the upper forward portion thereof, whereat the guide plate has an outwardly-bent flange 49 secured to the back side of the angle bar 25 supported at its ends by the standards 10 and 11. As shown in Figures 1 and 2, the drive pins 44 are positioned beyond the side edges of the guide plate 48 and are extended beyond the guide plate. In order that the base 1 will clear the drive pins, it is provided with slots 51 below the drum. Since a sheet record in loading position will overlie these slots with the drive holes 43 in registration with the rearward portions of the slots, the drive pins are mounted as plungers in respective tubular housings 52 and are urged into outer positions by compression springs 53 back of the pins. Thus, upon advancing the drum when a sheet record is in loading position, the drive pins will come to bear slidably against the portions of the sheet record overlying the slots 51 and will be cammed inwardly until the pins register with the drive holes, whereupon the pins will spring outwardly through the drive holes to connect the leading portion of the sheet record to the drum.

The forward end of the loading slot is flared outwardly to facilitate the insertion of a sheet record thereinto. The flaring is provided by an upwardly-inclined wall 54 forming a continuation of the upper plate 46, and a lower closure member or door 55 which is hinged at 56 to the lower plate 45. When the door is open it provides a forward extension of the bottom wall 54 as indicated by the dotted lines in Figure 1, but the door may be moved into closed position shown by the full lines in Figure 1 or may be reversely moved downwardly beyond its open position into its "eject" position indicated by the dash-dot lines in Figure 1. The door is hinged as by providing the lower plate 45 and the door with interleaved circular lugs traversed by a rod as shown in Figure 2.

A correct loading position for a sheet record is one wherein the trailing edge is between the outer edge of the open door 55 and the apex formed at the opening of the slot when the door is open. After the sheet record is inserted in the slot into such loading position, the door is closed to conceal the trailing edge and to provide a slight frictional hold on the trailing portion of the record between the door and the wall 54.

The upper plate 46 of the loading structure terminates at its rearward end in an upwardly-curved lip 57 (Figures 3–6). However, at the opposite sides of the loading slot there are blocks 58 and 59 which are preferably cast integrally with the top plate. These blocks have undercuts 60 to form with the lower plate 45 a continuous extension of the loading slot at each side thereof through the blocks. Secured to the back faces of the blocks as by screws 61 are light cantilever springs forming sheet-stripping fingers 62 which extend rearwardly into engagement with the bottom walls of the respective peripheral slots 41 and 42 in the drum. The purpose of these stripping fingers is to guide the trailing edge of a mounted sheet record positively into the loading slot when the drum is reversed. This positive stripping of a sheet record into the loading slot when the drum is reversed will occur equally well whether or not the trailing edge overlaps the leading edge of the record.

Reverse movement of the drum to eject a sheet record from the machine is provided by the drive motor 14 when the door 55 is pressed downwardly beyond its open position shown by dash-dot lines in Figure 1, but this feature is not herein claimed in its broadest aspects since the same is the subject of the pending Fritzinger application Serial No. 544,154, filed November 1, 1955, and having common ownership with the present invention, now Patent No. 2,906,585, dated September 29, 1959. However, in accordance with the present invention, the reverse drive of the drum is controlled so that it starts only when the trailing edge of the sheet record is in the aforementioned "eject" range—a range ahead of the stripping fingers but not beyond the upper end of the guide structure 48—notwithstanding the position of the trailing edge with respect to the stripping fingers and scanning heads when the door 55 is pressed beyond open position. If the trailing edge is out of the eject range when the door is so pressed, the first action is to advance the drum until the trailing edge is moved past the stripping fingers and then to automatically reverse the drum. The purpose of this feature of the invention is to avoid the necessity of lifting the heads from the drum during the ejecting operation, as well as to eliminate the hazard of the trailing edge being possibly fouled on parts of the machine were it to be moved in reverse direction past the opening in the guide structure 48 at the front of the drum.

The control apparatus for mounting and ejecting a sheet record onto and from the drum comprises a control bar 63 slidably mounted at the right side of the machine and extending horizontally from the front to the back thereof. This control bar is made of strip stock formed, for example, to have front and back portions in a vertical plane and an intermediate portion in a horizontal plane. The vertical portions are provided with mounting slots 64 and 65 which are traversed respectively by studs 66 and 67 mounted in the right standard. The control bar is biased forwardly by a tension spring 68 connected to the front stud 66. The positioning of the control bar is determined by engagement of a roller 69 on the front end thereof with an arcuate cam 70 mounted on the door 55. The cam is concentric with the pivot axis 56 of the door and serves to hold the control bar in its most rearward position until the door reaches an open position, at which point the roller rides into a notch 71 at the end of the cam to allow the bar 63 to take an intermediate position. The door is urged closed as by a torsion spring 72 on the rod 56 located in a space provided as by cutting short one of the hinge lugs aforementioned (Figure 2), but the door is detented when it reaches open position by engagement of the roller 69 with the notch 71 under influence of the spring 68. However, the door can be pressed further downwardly from its open position into its "eject" position aforementioned, and when this is done the control bar 63 is allowed to move farther forwardly as determined by the engagement of the roller 69 with the notch 71. At the rear of the machine there is a multiple switch mounted in an insulating stack 73 on the side standard 11. This multiple switch comprises a single-pole double-throw switch 74 and a single-pole single-throw switch 75. The actuating pole members of these switches are interconnected by an insulating bar 76 provided with an extending knob 77 which rides on a cam at the rear end of the control bar 63. When the control bar is in its most rearward position, the knob 77 rests in a notch 78 of the control bar to position the switch 74 so that it makes with its lower contact and to close the switch 75. As the door reaches an open position to allow the control bar to take its intermediate position, the knob 77 rides onto the higher lever face 79 to open both the switch 74 and the switch 75. If the door is moved further downwardly into its record-eject position to allow the control bar to take its forward position, the knob 77 rides onto a still higher cam face 80 to close the switch 74 with its upper contact while still maintaining the switch 75 open.

Figure 9:
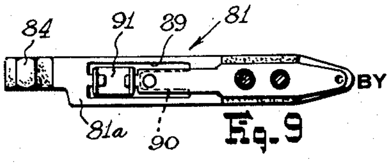
Figure 9 is a section on the line 9—9 of Figure 1.

There is provided a further single-pole double-throw switch 81 for controlling the record mounting and ejecting operations. This switch comprises three blades mounted in an insulating stack which in turn is mounted on an arm 82 pivoted at 83 to the side standard 11. The central pole member 81$a$ of the switch is provided with an insulating button 84 which is actuatable to shift the switch between its switching positions. The switch is shiftable bodily about the pivot 83 by the control bar 63 to place the button 84 into the path of a semicircular cam lobe 85 mounted on the shaft 12 of the drum 13. For instance, when the control bar is in its rearward position shown in Figure 1, the switch 81 is held in a rearward position against a stop pin 86 by a spring 87 connected between the arm 82 and a pin 88 on the control bar 63. In this rearward position of the switch 81 the mounting stud 67 abuts against the insulating button 84 to hold the pole member 81$a$ in a raised position relative to the other members of the switch. The pole member 81$a$ has a central cut-out 89, as shown in Figure 9, to provide it with an internal finger 90 which carries the contacts of the pole member. Positioned in the cut-out between the forward edge thereof and the free end of the internal finger is a U-shaped compression spring 91 which serves to bias the central pole member 81$a$ over center and to urge the finger always in the opposite direction from that of the free end of the pole member itself. Thus, when the insulating button is held raised by its abutment against the mounting stud 67, the switch 81 makes with its lower contact as shown in Figure 1.

In the intermediate position of the control bar 63 the spring 87 is relaxed but the switch 81 is still held bodily in its rearward position determined by abutment of the arm 82 against the stop pin 86. However, as the control bar is moved to its forward position responsive to moving the door 55 below its normally-open position, the pin 88 on the control bar moves against the arm 82 to shift the switch 81 bodily into a forward position wherein the button 84 is in the path of the cam lobe 85. If the drum is then in its eject range, the button 84 will be impinged against the cam lobe to shift the central pole member downwardly whereby contact is made with the upper blade of the switch. If the drum is not then in its eject range when the door 55 is moved below its normally-open position, the switch 81 is not shifted over center immediately will be by the cam lobe 85 striking against the button 84 as the drum is subsequently advanced into its eject range.

Figures 3, 5:
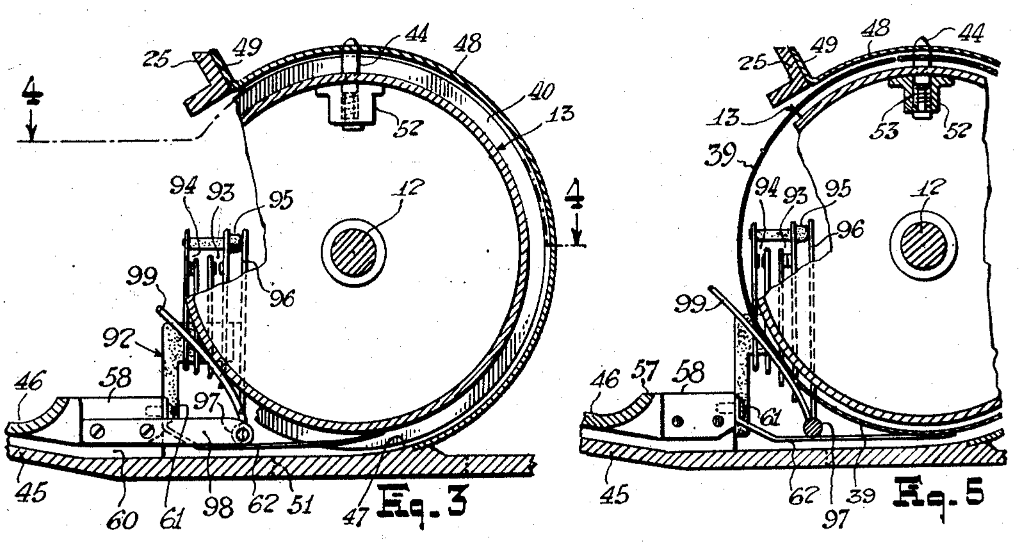
Figure 3 is a vertical section of a portion of the machine taken on the line 3—3 of Figure 4.
Figure 5 is a view similar to Figure 3 showing a sheet record on the drum and taken substantially on the line 5—5 of Figure 6.

For sheet mounting and signal control purposes there is provided a further multiple switch at the left side of the drum comprising four blades mounted in an insulating stack 92 which is itself bracketed to the back side of the block 58 as shown in Figures 3 and 4. This multiple switch comprises a normally-open single-pole single-throw switch 93 and a normally closed single-pole single-throw switch 94. The actuating pole members of these switches are interconnected by an insulating bar provided with an insulating button 95 which is operable by a pivot arm 96 carried by a shaft 97. One end of this shaft is journaled in the left standard 10 and the other in a bracket 98 secured to the right side of the block 58. Secured to the right end portion of this shaft is an arcuate actuating arm 99 which bears lightly against the bottom wall of the peripheral slot 41 in the drum under pressure from the pole members of the switches 93 and 94. When in the wrapping of a sheet record onto the drum the leading edge thereof comes to the arm 99, it cams this arm to turn the shaft counterclockwise to thereby actuate the pole members to close the switch 93 and concurrently to open the switch 94.

Figure 7:
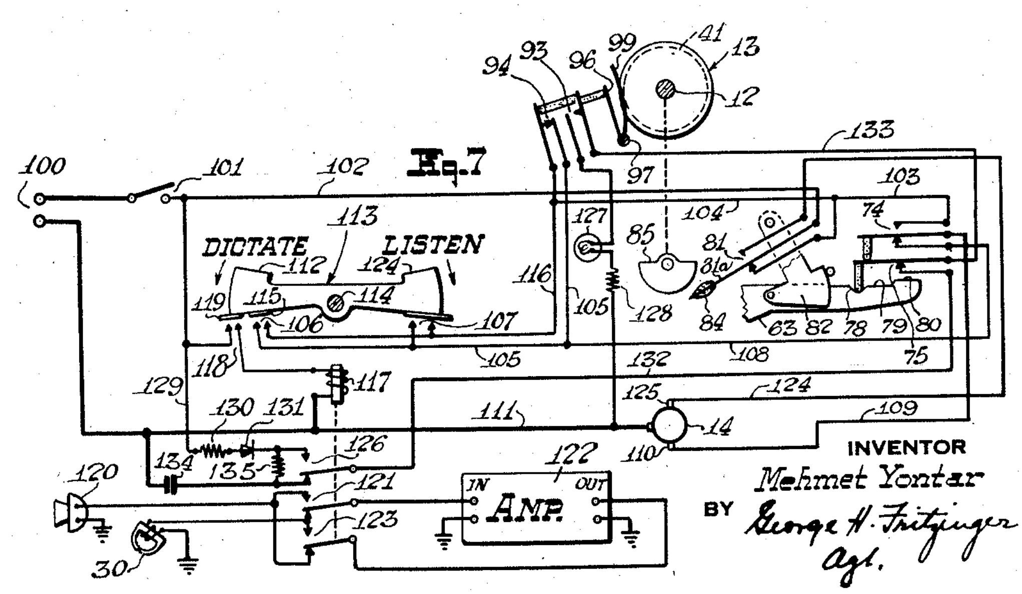
Figure 7 is a schematic circuit diagram of the machine.

The operation of the machine will now be apparent from the foregoing description taken with reference to the schematic circuit diagram shown in Figure 7. When the door 55 is open to receive a sheet record into a loading position, the control bar 63 is in its intermediate position causing the switches 74 and 75 to be open and the switch 81 to make with its lower contact. The machine is to be connected to a source of power via the terminals 100 and the master switch 101. However, the power circuit is now open because the master switch is connected by a lead wire 103 to switch 74 which is now making with its lower contact, and this lower contact is connected by a lead wire 193 to switch 74 which is now open and is connected also by lead wire 104, switch 94 and lead wire 105 to contacts 106 and 107 of respective "dictate" and "listen" switches which are also now open. When a sheet record has been inserted through the loading slot into a loading position and the door 55 is then closed, the control bar is moved to its rearward position to close the switch 74 with its lower contact. The power circuit is now completed from the lead wire 105 via the lead wire 108, switch 74, lead wire 109 to the forward terminal 110 of the reversible motor 14 and through the motor and lead wire 111 back to the other terminal of the power source. The motor 14 is therefore started in a forward direction to advance the drum 13. As the drive pins are moved past the leading edge of the sheet record, the pins engage the holes in the leading corner portions thereof and drive the record into wrap-around relation with the drum. Upon the leading edge of the drum being moved past the heads 29 and 30 to the arcuate actuating arm 99, it cams this arm out of the slot 41 to open the switch 94 and close the switch 93. The opening of the switch 94 breaks the circuit of the motor 14 to stop the rotation of the drum. The machine is now ready for recording dictation.

Upon pressing a "dictate" button 112 of a rocker 113 pivoted at 114, the contacts 106 are closed by a bridging member 115 to complete the circuit from the power terminals 100 through the motor via the lead wire 102, switch 81 making with its lower contact, lead wires 104 and 116, contacts 106, lead wires 105 and 108, switch 74 making with its lower contact, lead wire 109, motor 14 via its forward contact 110 and lead wire 111. At the same time a record-reproduce relay 117 is connected across the power source through contacts 118 interconnected by a bridging member 119 on the rocker 113 to shift this relay to its record position. By this operation of the relay 117 a transducer 120 acting as a microphone is connected through switch 121 via its upper contact to the input of an amplifier 122, and the output of this amplifier is connected through a switch 123 of the relay 117 via its upper contact to the recorder 30. (The erase head would now also be energized but need not be herein described.) When the dictate button is released the motor circuit is broken to stop the record drive and the circuit of the relay 117 is broken to cause the relay to return to its reproduce position. If the listen button 124 is depressed, the contacts 107 paralleling the contacts 106 are closed to again start the motor in the forward direction, but the relay 117 remains in its reproduce position. In this reproduce position the head 30, acting as a reproducer, is connected by the switch 121 via its lower contact to the amplifier input, and the amplifier output is connected by the switch 123 via its lower contact to the transducer 120 now operating as a speaker.

If the door 55 is opened to its record-eject position, the control bar is shifted forwardly to close the switch 74 with its upper contact, open the switch 75, and to shift the switch 81 bodily forwardly to place the operating button 84 into the path of the cam 85. If the drum 13 is not in its eject range at the instant the door is so moved to its eject position, the switch 81 will continue to make momentarily with its lower contact. A circuit is therefore completed from the terminals 100 through the switch 81, the switch 74, lead wire 109, motor 14 and lead wire 111 to cause the motor to start in the forward direction. As soon as the drum is so advanced into its eject range—which is to move the trailing edge of the mounted sheet record in a counterclockwise direction past the stripping fingers 62—the cam lobe 85 impinges against the button 84 and shifts the switch 81 to make with its upper contact. The power circuit is now completed from the power terminals 100 through the switch 81, lead wire 124 to the reverse contact 125 of the motor 14, and thence through the motor and the lead wire 111 to cause the motor to start in a reverse direction. By this reverse drive of the motor the drum is reversed to cause the sheet record to be stripped therefrom and to be fed, trailing edge first, through the loading slot to a point where the trailing edge will appear at the flared opening of the slot, it being understood that when the sheet record reaches this position the drive pins will automatically be disengaged from the drive holes in the sheet record. The dictator will then release his hand from the door 55 to pick up the trailing edge of the sheet record and withdraw it from the machine. If the drum was in its eject range when the door 55 was moved to its eject position, the button 84 would impinge immediately against the cam 85 and shift the switch 81 to make with its upper contact, with the result that the reverse drive of the drum would start immediately to eject the sheet record. Thus, in either case the reverse drive of the drum in the sheet-ejecting operation is started only when the drum is in its eject range. The feature of starting the reverse drive of the drum only when the drum is in its eject range eliminates the need for lifting the heads and prevents any possible fouling of the trailing edge on parts of the machine during the ejecting operation.

For signal control purposes there are provided the switches 75 and 93 as well as an additional single-pole double-throw switch 126 in the record-reproduce relay 117. The signal device may be a lamp 127 connected through a resistor 128 to one of the power terminals 100. If the dictator presses the dictate button 112 while a record is mounted on the drum and if the door 55 is then closed, a circuit is completed to cause the lamp 127 to give a steady light. This circuit is completed through lead wire 129, resistor 130, rectifier 131, switch 126 making with its upper contact, lead wire 132, switch 75, lead wire 133, switch 93, lamp 127 and resistor 128. If either the door 55 is open or a record is not mounted on the drum, the lamp circuit is open and no signal will be given.

If the dictator presses the listen button 124 while the door 55 is closed and a record is mounted on the drum, the lamp will give a flashing light. This is because the lamp circuit is now completed by the switch 126 now making with its lower contact through a condenser 134 which is charged through a resistor 135 and the rectifier 131. But the charge for this condenser will leak off intermittently through the lamp to cause the lamp to flash. As before, if either the door 55 is open or a record is not mounted on the drum, the lamp circuit is not completed and the lamp will not give any signal at all.

The embodiment of my invention herein particularly shown and described is intended to be illustrative and not limitative of my invention since the same is subject to changes and modifications without departure from the scope of my invention, which I endeavor to express according to the following claims.

I claim:

1. In a machine having a revolvable record support with an endless record-supporting surface about which a flexible sheet record is adapted to be wrapped through substantially one complete revolution with its leading edge attached to said support: the combination of a fastening means on said support and of complementary means on the leading portion of the sheet record interengageable for attaching the sheet record to the support; a structure having an opening leading from said support and including a stripper means for guiding a sheet record from the support, trailing edge first, into said opening as the support is reversed; power-operated reverse drive means for said support; manually-operable start means for said reverse drive means; and means controlled by said start means and said record support according to the angular positioning of the latter about its rotational axis for causing reverse rotation of said record support to start in response to operation of said start means only when the record support is in a predetermined range of its movement.

2. In a machine having a revolvable record support with an endless record-supporting surface about which a flexible sheet record is adapted to be wrapped through substantially one complete revolution with its leading edge attached to said support: the combination of a fastening means on said support and of complementary means on the leading portion of the sheet record interengageable for attaching the sheet record to the support; a structure having an opening leading from said support and including a stripper means for guiding a sheet record from the support, trailing edge first, into said opening as the support is reversed; reversible drive means selectively controllable to revolve said support in either forward or reverse directions; start control means for said drive means; and means controlled according to the positioning of said record support when said start control means is operated for determining the direction of drive of the record support.

3. In a machine having a revolvable record support with an endless record-supporting surface about which a flexible sheet record is adapted to be wrapped through substantially one complete revolution with its leading edge attached to said support: the combination of a fastening means on said support and of complementary means on the leading portion of the sheet record interengageable for attaching the sheet record to the support; a structure having an opening leading from said support and including a stripper means for guiding a sheet record from the support, trailing edge first, into said opening as the support is reversed; reversible drive means selectively controllable for revolving said support in either forward or reverse directions; a head spaced circumferentially about said record support from said stripper means for scanning engagement with a sheet record on said support; start control means for said drive means; and means controlled according to the positioning of said record support when said start control means is operated for causing said support to be started in a reverse direction when the trailing edge of the mounted sheet record is in an eject range ahead of said stripper means not extending beyond said scanning head and for causing said support to be started in a forward direction when the trailing edge is in a second range ahead of said scanning head not extending beyond said stripper means.

4. In a machine having a revolvable record support with an endless record-supporting surface about which a flexible sheet record is adapted to be wrapped through substantially one complete revolution with its leading edge attached to said support: the combination of a fastening means on said support and of complementary means on the leading portion of the sheet record interengageable for attaching the sheet record to the support; a structure having an opening leading from said support and including a stripper means for directing a sheet record from the support, trailing edge first, into said opening as the support is reversed; reversible drive means selectively controllable for revolving said support in either forward or reverse directions; a head spaced circumferentially about said record support from said stripper means and movable across said support for scanning engagement with a mounted sheet record as the support is revolved; guide means extending from said stripper means in the direction of forward movement of said support and in spaced relation to said support to cover at least partially the portion of the support between the stripper means and said head; a start control means operative to start said record support in a forward direction when the trailing edge of the mounted sheet record is in a range ahead of said guide means but not beyond said stripper means; and means controlled by said record support according to the rotational positioning thereof for reversing said drive means when the trailing edge of a mounted sheet record has been moved past said stripper means.

5. In a machine having a revolvable record support with an endless record-supporting surface about which a flexible sheet record is adapted to be wrapped with its leading edge attached to said support: the combination of a fastening means on said support and of complementary means on the leading portion of a sheet record interengageable for attaching the sheet record to the support; a loading structure having a slot leading tangentially to said record support for guiding a sheet record into a loading position for attachment with said fastening means and for receiving the sheet record, trailing edge first, as the record support is reversed; a movable member at the outer end of said slot forming a guide adapted to facilitate insertion of the leading edge of a sheet record into the slot; means for driving said record support in forward and reverse directions; means for starting said drive means by moving said guide member beyond a normal, open position; guide means extending from said slot at least partially around said record support in spaced relation thereto; and means operated in corresponding relation with the movement of said support for causing said drive means to start in a forward direction when the trailing edge of the mounted sheet record is ahead of the far end of said guide means but not beyond said slot, and in a reverse direction when the trailing edge is ahead of said slot but not beyond the far end of said guide means.

6. The combination set forth in claim 5 including means controlled by said record support and effective upon said support having been started in a forward direction for reversing said drive means when the trailing edge of the sheet record is advanced beyond said slot.

References Cited in the file of this patent

UNITED STATES PATENTS

| | | |
|---|---|---|
| 1,206,462 | Nott | Nov. 28, 1916 |
| 2,036,171 | Fox | Mar. 31, 1936 |
| 2,403,711 | Egan | July 9, 1946 |
| 2,431,360 | Philpott | Nov. 25, 1947 |
| 2,464,389 | Grau | Mar. 15, 1949 |
| 2,641,654 | Offutt | June 9, 1953 |
| 2,649,517 | Egan | Aug. 18, 1953 |
| 2,653,819 | Roberts | Sept. 29, 1953 |
| 2,812,948 | Roberts | Nov. 12, 1957 |